United States Patent
Pan et al.

(10) Patent No.: US 12,346,234 B2
(45) Date of Patent: Jul. 1, 2025

(54) METHOD, DEVICE, AND COMPUTER READABLE STORAGE MEDIA FOR DATA ANALYSIS

(71) Applicant: NEC CORPORATION, Tokyo (JP)

(72) Inventors: Zheng Pan, Beijing (CN); Chunchen Liu, Beijing (CN)

(73) Assignee: NEC CORPORATION, Tokyo (JP)

( * ) Notice: Subject to any disclaimer, the term of this patent is extended or adjusted under 35 U.S.C. 154(b) by 1122 days.

(21) Appl. No.: 17/217,238

(22) Filed: Mar. 30, 2021

(65) Prior Publication Data

US 2021/0304015 A1      Sep. 30, 2021

(30) Foreign Application Priority Data

Mar. 31, 2020   (CN) .......................... 202010247398.4

(51) Int. Cl.
   *G06F 11/00*       (2006.01)
   *G06F 11/30*       (2006.01)
   (Continued)

(52) U.S. Cl.
   CPC ...... *G06F 11/3466* (2013.01); *G06F 11/3058* (2013.01); *G06F 11/3438* (2013.01);
   (Continued)

(58) Field of Classification Search
   CPC .......................... G06F 11/3466; G06F 11/3058
   (Continued)

(56) References Cited

U.S. PATENT DOCUMENTS 6,289,379 B1 * 9/2001 Urano ................. H04L 43/0817
                                                              714/25
6,611,955 B1 * 8/2003 Logean ................... G06F 11/36
                                                              714/38.1
(Continued)

FOREIGN PATENT DOCUMENTS

CN       109800881 A      5/2019
JP       6-332881 A      12/1994
(Continued)

OTHER PUBLICATIONS

Wang Wanxiang, "Forecast of Railway Passenger vol. Using System Dynamics", Journal of Dalian Jiaotong University, Oct. 2014, vol. 35, No. 5, pp. 10-12 and 16 (4 pages total).

(Continued)

*Primary Examiner* — Sarai E Butler
(74) *Attorney, Agent, or Firm* — Sughrue Mion, PLLC

(57) ABSTRACT

Embodiments of the present disclosure relate to a method, a device and a computer-readable storage medium for data analysis. The method comprises: generating, at least based on historical conditional data associated with a historical factor affecting a historical event and historical result data, an association between the historical factor and a result of the historical event, the historical result data indicating the result of the historical event caused by the historical factor; determining at least one target result of interest selected for a current event, the current event being associated with the historical event; determining a current factor affecting the current event and at least one target object associated with the at least one target result of interest; and determining data of the at least one target result of interest at least based on the association, current conditional data associated with the current factor and the at least one target object. In this way, (Continued)

finer-grained prediction can be realized, and user demands on decision refinement can be satisfied.

17 Claims, 6 Drawing Sheets

(51) Int. Cl.
*G06F 11/34* (2006.01)
*G06F 18/23* (2023.01)
*G06N 5/01* (2023.01)

(52) U.S. Cl.
CPC ............ *G06F 18/23* (2023.01); *G06N 5/01* (2023.01); *G06F 2201/81* (2013.01)

(58) Field of Classification Search
USPC ...................................................... 714/1–57
See application file for complete search history.

(56) References Cited

U.S. PATENT DOCUMENTS

| | | | | |
|---|---|---|---|---|
| 2001/0029591 A1* | 10/2001 | Takeda | ............... | G06F 11/1469 714/E11.122 |
| 2003/0037287 A1* | 2/2003 | Nakamura | ............... | H04L 1/22 714/30 |
| 2004/0153718 A1* | 8/2004 | Shen | .................. | G06F 11/2087 714/5.11 |
| 2004/0153776 A1* | 8/2004 | Rhea | .................. | G06F 11/0769 714/E11.182 |
| 2005/0102574 A1* | 5/2005 | Larson | ............... | G06F 11/2236 714/E11.166 |
| 2005/0240794 A1* | 10/2005 | Sinha | .................. | G06F 11/3684 714/1 |
| 2006/0150028 A1* | 7/2006 | Blaisdell | ............... | G06F 11/008 714/39 |
| 2008/0133973 A1* | 6/2008 | Mizoe | .................. | G06Q 10/06 714/37 |
| 2010/0005341 A1* | 1/2010 | Agarwal | ............ | G06F 11/3692 714/38.11 |
| 2010/0174671 A1 | 7/2010 | Brooks et al. | | |
| 2011/0055138 A1* | 3/2011 | Khanduja | ............... | H04L 43/00 709/224 |
| 2013/0116996 A1* | 5/2013 | Callan | .................. | G07C 5/085 703/8 |
| 2015/0254125 A1* | 9/2015 | Kakui | .................. | G06F 11/008 714/47.3 |
| 2015/0280969 A1* | 10/2015 | Gates | .................. | H04L 41/0631 714/37 |
| 2018/0025291 A1* | 1/2018 | Dey | ........................ | G06N 7/01 706/11 |
| 2018/0060729 A1* | 3/2018 | Osogami | .................. | G06N 3/08 |
| 2019/0012553 A1* | 1/2019 | Maruchi | ............... | G06F 11/079 |

FOREIGN PATENT DOCUMENTS

| | | |
|---|---|---|
| JP | 2016-118975 A | 6/2016 |
| JP | 2018-139036 A | 9/2018 |

OTHER PUBLICATIONS

Nan Feng et al., "A Data-driven Assessment Model for Information Systems Security Risk Management", Journal of Computers, Dec. 2012, vol. 7, No. 12, pp. 3103-3109 (7 pages total).

Communication dated Feb. 14, 2025, issued in Chinese Application No. 202010247398.4.

Communication dated Jan. 7, 2025, issued in Japanese Application No. 2021-056535.

* cited by examiner

METHOD, DEVICE, AND COMPUTER READABLE STORAGE MEDIA FOR DATA ANALYSIS

FIELD

Embodiments of the present disclosure generally relate to the field of artificial intelligence, and more specifically, to a method, a system and a storage medium for data analysis.

BACKGROUND

Generally speaking, before making a decision, users hope to evaluate the possible effects of the decision in advance or compare the effect differences between multiple decision schemes in advance. For example, in the field of market research, decision makers want to know whether customer satisfaction can be improved by adjusting products, services, brands and other strategies, and which strategy can be used to achieve the best improvement result.

In another example, in the field of human resources management, managers want to know what incentive effects can be achieved with different employee incentive policies, so as to find a balance between the interests of enterprises and the interests of employees. In addition, in the field of failure identification, operators want to know which technical process, operating method, and equipment structure improvements can reduce the possibility of the occurrence of failure.

The possible effects of the decision may be realized by a causality model-based policy prediction system. Usually such causal models may be built through historical data. After building a causal model, the policy prediction system may predict policy effects by inputting different policies, thereby realizing the evaluation of decision effects and helping users to select a policy with optimal effect.

SUMMARY

Embodiments of the present disclosure provide a method, a system and a storage medium for data analysis.

According to a first aspect of the present disclosure, a method for data analysis is proposed. The method comprises: generating, at least based on historical conditional data associated with a historical factor affecting a historical event and historical result data, an association between the historical factor and a result of the historical event, the historical result data indicating the result of the historical event caused by the historical factor; determining at least one target result of interest selected for a current event, the current event being associated with the historical event; determining a current factor affecting the current event and at least one target object associated with the at least one target result of interest; and determining data of the at least one target result of interest at least based on the association, current conditional data associated with the current factor and the at least one target object.

According to a second aspect of the present disclosure, a device for data analysis is proposed. The device comprises: at least one processing unit; at least one memory, the at least one memory being coupled to the at least one processing unit and storing instructions to be executed by the at least one processing unit, the instructions, when executed by the at least one processing unit, causing the device to perform acts, including: generating, at least based on historical conditional data associated with a historical factor affecting a historical event and historical result data, an association between the historical factor and a result of the historical event, the historical result data indicating the result of the historical event caused by the historical factor; determining at least one target result of interest selected for a current event, the current event being associated with the historical event; determining a current factor affecting the current event and at least one target object associated with the at least one target result of interest; and determining data of the at least one target result of interest at least based on the association, current conditional data associated with the current factor and the at least one target object.

According to a third aspect of the present disclosure, a computer-readable storage medium is provided. The computer-readable storage medium comprises computer-readable program instructions stored thereon, the computer-readable program instructions being used to perform a method described according to the first aspect of the present disclosure.

The Summary is to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent, wherein the same reference sign usually refers to the same component in the example embodiments of the present disclosure.

DETAILED DESCRIPTION OF EMBODIMENTS

Figure 1:
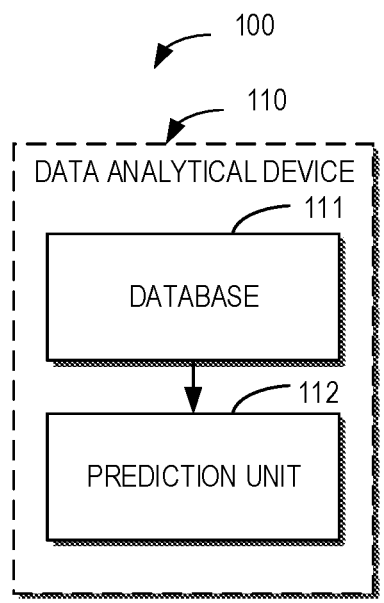
FIG. 1 shows a schematic view of an environment in which embodiments of the present disclosure can be implemented.

The preferred embodiments of the present disclosure will be described in more detail with reference to the drawings. Although the drawings illustrate the preferred embodiments of the present disclosure, it should be appreciated that the present disclosure can be implemented in various manners and should not be limited to the embodiments explained herein. On the contrary, the embodiments are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "a further embodiment" is to be read as "at least a further embodiment." The terms "first", "second" and so on can refer to same or different objects. The following text also can include other explicit and implicit definitions.

In the embodiments of the present disclosure, the term "model" usually refers to a relational structure of a certain system which is generally or approximately expressed in mathematical language with reference to features of the system. A model usually may be generated by training known data. The generated model may include a model structure, model parameters, and the like. Model parameters may vary depending on the type of model. The term "causal model" generally refers to a structure describing the causal effect of a system.

Generally speaking, before making a decision, users hope to evaluate the possible effects of the decision or compare the differences in effects between multiple decision schemes in advance. For example, in the retail industry, before making a promotion plan, decision makers want to know how much profit each promotion plan will bring, so as to choose the best promotion plan.

With the constant development of computer technology, data analysis has been widely applied in various aspects of people's lives, and analytical devices such as deep neural network models are increasingly used in various types of tasks such as decision evaluation and target prediction. Therefore, the possible effects of the above decisions may be realized by building a causal model. Such a causal model usually may be built with historical data. After building the causal model, a policy prediction system may predict the effects of policies by inputting different policies, thereby realizing the evaluation of policy effects and satisfying user demands in every field.

However, with respect to data for generating causal models, conventional solutions have specific type requirements on the type of data samples, thus limiting the generation of models to some extent. In addition, there are some problems with causal models generated according to conventional solutions, for example, model structure generated based on Bayesian networks. For example, such causal models can only predict average effect but cannot make finer-grained prediction for individuals or different groups, thereby failing to meet user demands on decision refinement. Therefore, it is desirable to realize more precise and pertinent prediction of decisions for target objects with different granularity.

In addition, it is desirable to implement an automated data analysis solution. For example, data samples can be continuously or periodically obtained from user equipment or information collection devices such as industrial sensors as decision data, so that corresponding decision effects can be analyzed according to user demands.

It might be further desirable to evaluate the predicted decision effects. Once it is found that there is a difference between the predicted decision effects and user expected effects, an alert is generated for users so that users can adjust policies in time.

According to some embodiments of the present disclosure, a solution is proposed for data analysis. In this solution, first, based on historical conditional data associated with a historical factor affecting a historical event and historical result data, an association between the historical factor and the historical event is generated. The historical result data indicates a result of the historical event caused by the historical factor. Subsequently, at least one target result of interest selected for a current event may be determined. There is a certain association between the current event and the historical event. Afterwards, a current factor affecting the current event and at least one target object associated with the at least one target result of interest may be determined. Further, data of the at least one target result of interest may be determined at least based on the association, current conditional data associated with the current factor and the at least one target object. In this way, a finer-grained prediction can be realized, and user demands on decision refinement can be satisfied.

Example Environment

With reference to the accompanying drawings, detailed description is presented below according to the embodiments of the present disclosure. FIG. 1 shows a schematic view of an example environment 100 in which a plurality of embodiments of the present disclosure can be implemented. As depicted, the example environment 100 includes a data analytical device 110. The data analytical device 110 may include a database 111 and a prediction unit 112.

The database 111 may be used to store needed data files which are obtained through various channels, such as information collection devices, questionnaires, and the like. For example, with respect to the retail industry, the database 111 may store information such as past promotion plans and historical sales records.

In addition, the database 111 may further have a function of performing conventional pre-processing on data. The pre-processing may, for example, include steps such as abnormal data detection, data cleaning, missing value filling, sample filtering and factor selection, thereby improving the data quality.

The prediction unit 112 may utilize known data which is extracted from the database 111 to learn specific knowledge for processing new data. The prediction unit 112 may be designed to perform various tasks, such as decision evaluation, result prediction, target detection, and the like. Examples of the prediction unit 112 include, but are not limited to, various types of deep neural networks (DNNs), convolutional neural networks (CNNs), support vector machines (SVMs), decision trees, random forest models, and the like.

In some embodiments, if the prediction unit 112 is used to perform a decision evaluation task, for example, evaluating the impact of a mall's promotion event on the mall's sales through some business data, the prediction unit 112 may provide an evaluation of an inputted factor associated with the mall's promotion event.

In some embodiments, the prediction unit 112 may obtain, from the database 111 business data associated with a historical promotion event and generate a causality model between a result (e.g., sales) and a factor affecting the historical promotion event based on these data. In some embodiments, the factor affecting a current promotion event may be inputted to the causality model built by the prediction unit 112 to predict a result of interest that is associated with the current promotion event.

In some embodiments, if the prediction unit 112 is used to perform target detection under industrial automation scenarios, the prediction unit 112 analyzes the impact on device failure through data associated with, for example, technical processes, operating methods and device structure.

In some embodiments, the prediction unit 112 may periodically obtain data samples associated with device operations and device attributes from an external information collection device and perform data analysis of the impact of data samples on device failure. If determining that the possibility that some device operations and device attributes cause device failure exceeds a threshold scope, the prediction unit 112 may further send an early warning to the user.

It should be understood that the operating environment 100 shown in FIG. 1 is only for the purpose of illustration, without limiting the operating environment. The operating environment 100 may further include any number of computing units or processing units.

In conjunction with FIG. 1, further detailed description is presented below to the process of generating a causality model in the prediction unit 112 and the prediction with respect to a predetermined target.

Example of Causality

Figure 2:
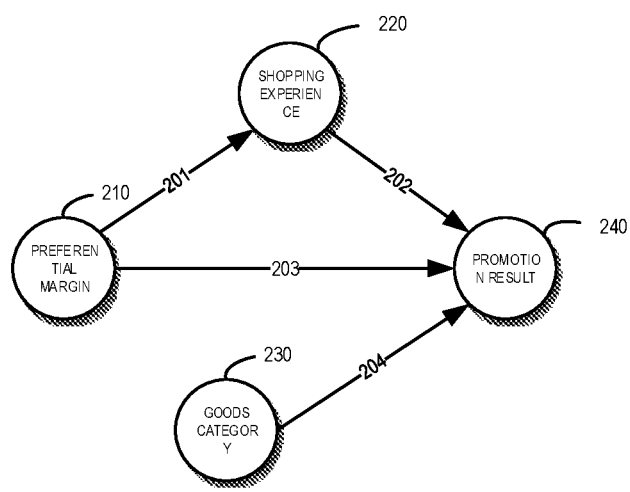
FIG. 2 shows a directed acyclic graph of an instance of causality according to embodiments of the present disclosure.

FIG. 2 illustrates a directed acyclic graph (DAG) of an instance of causality according to the embodiments of the present disclosure. Before describing the process of generation of a causality model and the prediction, first an instance about causal effect will be illustrated in conjunction with FIG. 2.

The causal effect among a plurality of variables is usually described using DAG. The DAG may include nodes representing variables, directed edges and paths representing the causal effect between the variables. For example, a directed edge pointing from a parent node to its child node may indicate that there is a direct causal effect between the variable represented by the parent node and the variable represented by the child node. In another example, a path from one node to another node may indicate that there is an indirect causal effect between the variables represented by the two nodes.

In FIG. 2, variable "preferential margin" 210 and variable "goods category" 230 may be regarded as processing variables, and variable "promotion result" 240 may be regarded as a result variable. Edges 203 and 204 from the variable "preferential margin" 210 and the variable "goods category" 230 to the variable "promotion result" 240 may be defined as direct edges, which indicates that the variable "preferential margin" 210 and the variable "goods category" 230 may exert direct impact on the variable "promotion result" 240.

In addition, FIG. 2 further includes a mediating variable "customer experience" 220. An edge 201 from the variable "preferential margin" 210 to the variable "customer experience" 220 may be defined as a direct edge, while an edge 202 from the variable "preferential margin" 210 through the variable "customer experience" 220 to the variable "promotion result" 240 may be defined as an indirect edge. This indicates that the variable "preferential margin" 210 is able to affect the variable "customer experience" 220, while the variable "customer experience" 220 may further affect the variable "promotion result" 240.

For example, if the preferential margin is large, it may cause too many customers to come shopping and even beyond the load which the mall can bear. Thus, some cases that affect the customer experience might be caused, such as insufficient parking lots in the mall, the reduced service level of sales staff, insufficient inventory of goods, and the like. Therefore, the customer experience will also affect the final sales.

It should be understood that the directed acyclic graph shown in FIG. 2 merely illustrates condition variables (i.e., processing variables and mediating variables) that might affect result variables. The directed acyclic graph shown in FIG. 2 may further include other possible processing variables and mediating variables as well as direct edges and/or indirect edges between them and the result variables.

Example Usage Scenario

Figure 3:
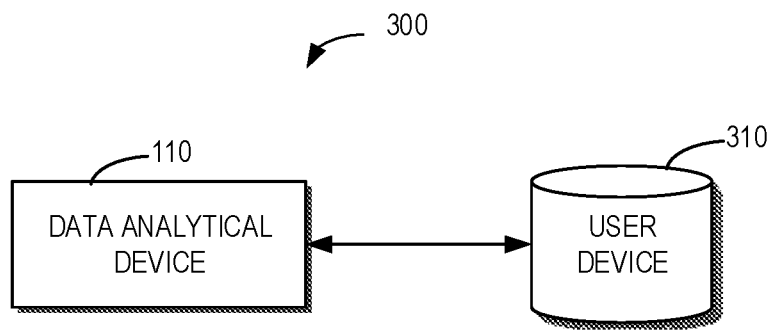
FIG. 3 shows a schematic view of a usage scenario according to embodiments of the present disclosure.

FIG. 3 illustrates a schematic view of one usage scenario according to the embodiments of the present disclosure. The application of the embodiments of the present disclosure will be further explained in conjunction with FIG. 3.

As shown in FIG. 3, a usage scenario 300 may include the data analytical device 110 in FIG. 1 and a user device 310. Communication may be performed between the data analytical device 110 and the user device 310.

For example, in the causality model building stage, the data analytical device 110 may periodically obtain from the user device a plurality of data samples associated with conditional data that might affect a to-be-predicted target result, so that the data analytical device 110 is able to build a causal model for predicting the target result based on a large number of data samples.

In some embodiments, if the data analytical device 110 performs target detection under an industrial automation scenario, the user device 310, for example, may be connected with a plurality of industrial sensors (not shown) arranged under the industrial automation scenario. The industrial sensors report collects environmental data to the user device 310, and the environmental data is sent via the user device 310 to the data analytical device 110 so that the data analytical device is able to obtain enough data samples.

In addition, in the result prediction stage, the data analytical device 110 may obtain from the user device 310 some personalized requirements of the user for the prediction process, such as the prediction target of interest, constraint conditions for the data samples, and the like. After the completion of prediction, the data analytical device 110 may send a prediction result to the user device 310.

In some embodiments, if the data analytical device 110 determines that there is a big difference between the prediction result and the user's desired result, then the data analytical device 110 may further send an alert about the difference to the user device 310.

It should be understood that FIG. 3 merely illustrates an example application scenario, in which there may be included any number of user devices 310. In addition, the data analytical device 110 may also be integrated into the user device 310 as a module of the user device 310 or in the form of a chip.

Example Interaction Process

Figure 4:
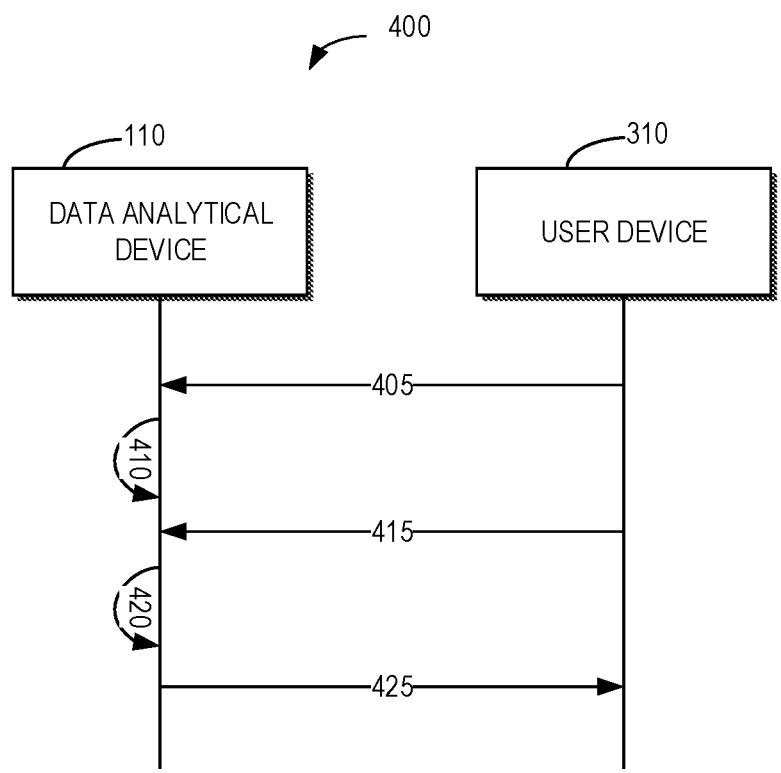
FIG. 4 shows a schematic view of interaction process of data analysis according to embodiments of the present disclosure.

FIG. 4 illustrates a schematic view of an interaction process 400 of data analysis according to the embodiments of the present disclosure. The interaction process may be implemented in the usage scenario shown in FIG. 3. Therefore, the interaction process will be described by taking the data analytical device 110 and the user device 310 in FIG. 3 as an example.

The data analytical device 110 may obtain 405, from the user device 310, conditional data of a factor that affects an event and data of an event result caused by the factor. In some embodiments, the conditional data may be periodically or continuously sent from the user device 310 to the data analytical device 110. The conditional data may be, for example, data inputted by the user to the user device 310. Optionally, the conditional data may also be data which is collected and reported to the user device 310 by other peripheral data collection device connected to the user device 310, for example, a sensor and so on.

From a large number of data samples, the data analytical device 110 may determine 410 the causality between the conditional data and the result data, such as a plurality of data samples of temperature data about a component as collected by a sensor, environmental data about an industrial environment where the component is located, usage frequency data of the component, aging degree data of the component. For example, the data analytical device 110 may determine for the component the impact of the component temperature level, environmental factor and usage frequency on the component aging degree for the component. In addition, the data analytical device 110 may further predict the possibility of failure occurrence of the component, frequency intervals between failure occurrences, the resulting device maintenance cost and the like.

The user device 310 may send 415 an indication for another event to the data analytical device 110. The indication may include, for example, one or more of a prediction target of interest for the further event, a possible factor affecting the further event, a constraint condition related to the possible factor, and a target object associated with the target result that a user is interested in.

For example, the data analytical device 110 obtains from the indication conditional data of the possible factor affecting the further event and the prediction target of interest for the further event. For example, the conditional data of the possible factor may be some environmental parameters of an operating environment where another component is located, and the further component is made of the same material as a component in a previous event. The data analytical device 110 may determine that the further event is associated with the previous event and may further obtain a causality model built based on the previous event.

The data analytical device 110 may determine 420 the result of the prediction target of that a user is interested in for the further event from the one or more information obtained from the indication from the user device 310 and according to the causality model. For example, the data analytical device 110 may input the one or more information obtained from the indication from the user device 310 to the causal model and use an output result of the causal model as the result of the prediction target.

The data analytical device 110 may send 425 the result of the prediction target to the user device 310. If the user is not satisfied with the result of the prediction target, the conditional data of the factor affecting the event may be adjusted and sent to the data analytical device 110 for further prediction.

In addition, the data analytical device 110 may perform an automatic analysis based on the result of the prediction target. For example, the user device 310 has already sent the desired result scope to the data analytical device 110. Based on the desired result scope, if the data analytical device 110 determines that the difference between the prediction result and the desired result exceeds a threshold difference, then the data analytical device may send an alert about the difference to the user device.

The data analysis process according to the embodiments of the present disclosure has been described in brief from the perspective of data interaction. Details of data analysis will be further illustrated in conjunction with another embodiment.

Example Process of Data Analysis

Figure 5:
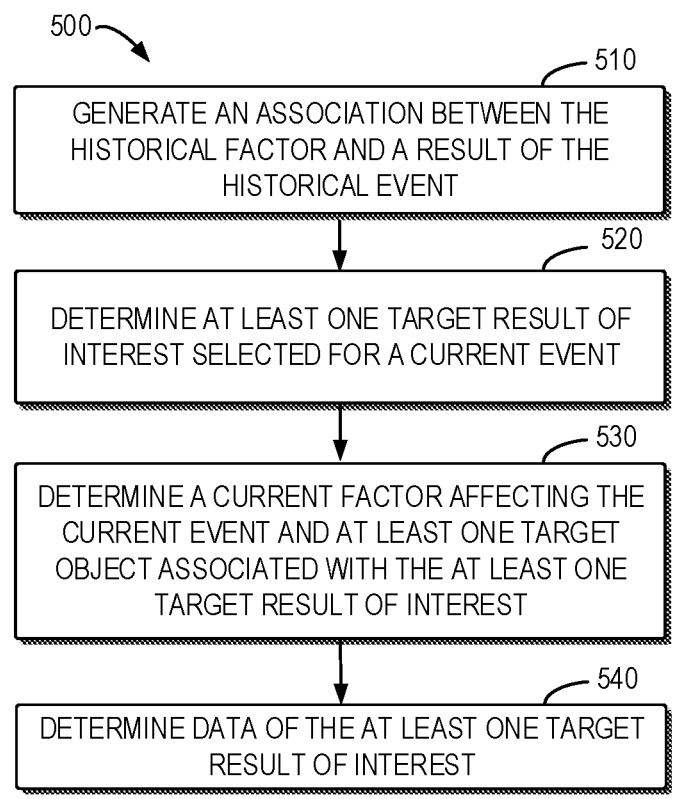
FIG. 5 shows a flowchart of an example process of data analysis according to embodiments of the present disclosure.

The process of data analysis will be described in more detail with reference to FIGS. 5 to 7. FIG. 5 shows a flowchart of a process 500 of data analysis according to some embodiments of the present disclosure. The process 500 may be implemented by the data analytical device 110 of FIG. 1. For the sake of discussion, the process 500 will be described in conjunction with FIG. 1.

As shown in FIG. 5, at block 510, at least based on historical conditional data associated with the historical factor affecting a historical event and historical result data, the data analytical device 110 generates an association between a historical factor and a result of the historical event. The historical result data indicates the result of the historical event caused by the historical factor.

In some embodiments, the data analytical device 110, for example, may obtain historical conditional data. The historical conditional data may be obtained from, for example, the database 111 shown in FIG. 1. In addition, the historical conditional data may also be obtained in other ways, for example, periodically obtained from a data collection device to the data analytical device 110. As described above, the data collection device may be directly or indirectly connected to the data analytical device 110. The data collection device may be a plurality of sensors, for example.

In some embodiments, the obtained historical conditional data may include different data types. For example, data samples of this historical conditional data may be discrete. In addition, data samples of the historical conditional data may also be continuous. Or data samples of the historical conditional data may include both discrete data samples and continuous ones.

In some embodiments, the data analytical device 110 may further determine historical result data associated with the historical conditional data. Since the historical conditional data is associated with the historical factor that affects the historical event, the historical result data may indicate a result of the historical event caused by the historical factor. For example, as shown in the directed acyclic graph that represents causality in FIG. 2, the historical conditional data, for example, may be situation of preferential margins, and the historical result data, for example, may be situation of promotion results. This historical result data may also be directly obtained from the database 111. Alternatively, the historical result data may also be obtained from historical event record information inputted from other external device.

Based on the historical conditional data and the historical result data, the data analytical device 110 is able to generate an association between the historical factor and the result of the historical event.

One possible case is that since the number of the obtained data samples of the historical conditional data is insufficient or relatively unitary, historical result data associated with some historical conditional data that cannot be directly obtained. For example, the obtained data samples of the historical conditional data are data related to makeup promotion, and the historical result is about the profits of women's clothing promotion. Since the variation in goods type will lead to differences in consumer groups, consumption cycles and consumption power, it is impossible to establish direct causality between historical condition data and historical result data.

Other data perhaps might be needed to determine a relationship between them. Therefore, block 510 of FIG. 5 will be further illustrated in conjunction with FIG. 4. FIG. 6 is a flowchart of a process of determining a historical factor and a historical event result according to the embodiments of the present disclosure.

At block 610, the data analytical device 110 obtains historical conditional data. At block 620, the data analytical device 110 judges whether the number of data samples of the obtained historical conditional data is below a threshold number. If the number of data samples of the historical conditional data is below the threshold number, i.e., the number of samples is insufficient, then at block 630, the data analytical device 110 obtains reference data. The reference data includes, for example, expert knowledge. The reference data can indicate the degree of impact of the historical conditional data on the historical result data.

Figure 6:
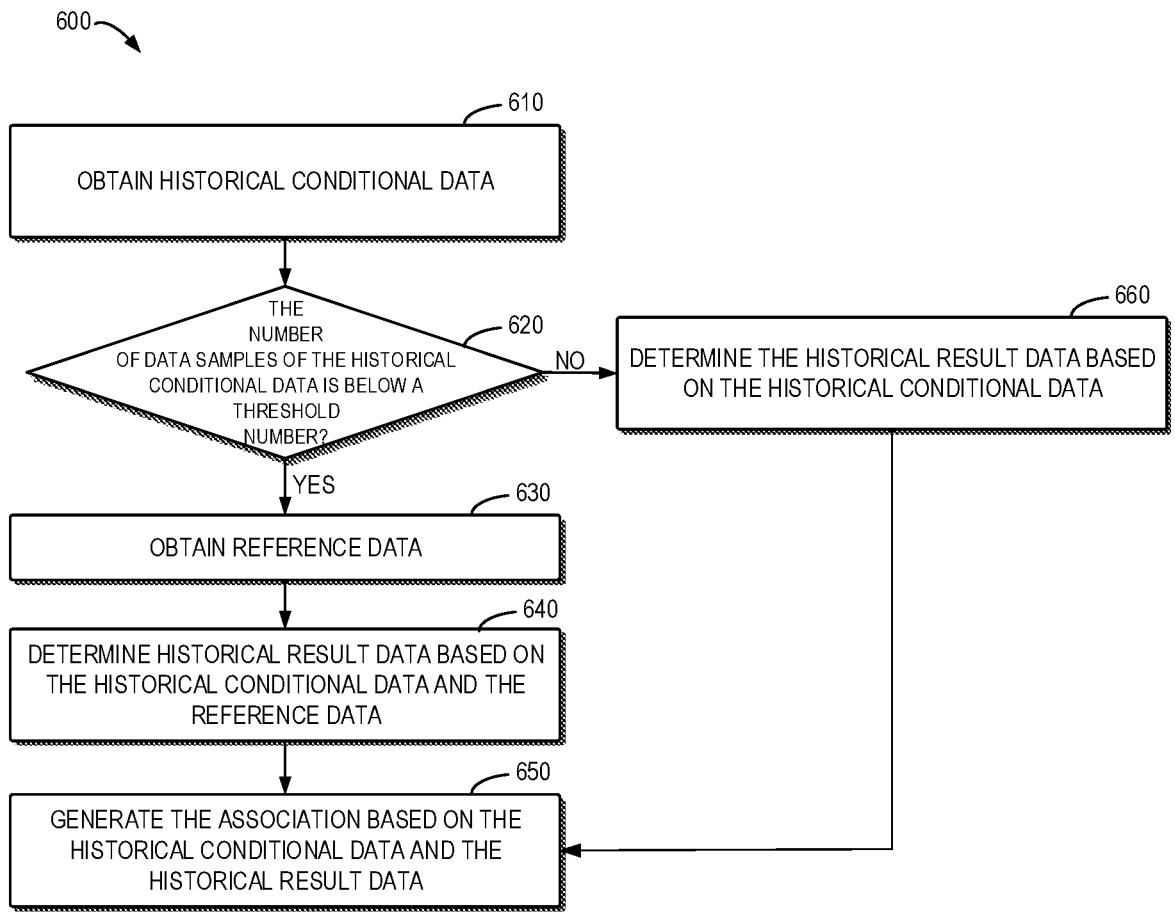
FIG. 6 shows a flowchart of a process of determining an association between a historical factor and the result of a historical event according to embodiments of the present disclosure.
Figure 7:
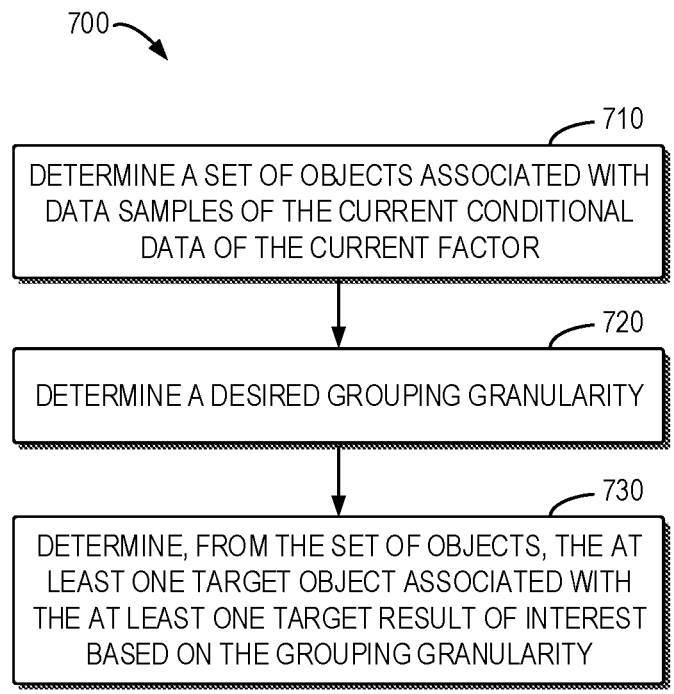
FIG. 7 shows a flowchart of a process of determining a target object according to embodiments of the present disclosure.

Still with reference to FIG. 6, at block 640, the data analytical device 110 may determine the historical result data through the historical conditional data and the reference data. At block 650, the data analytical device 110 may generate the association based on the historical conditional data and the historical result data.

Continuing to refer FIG. 6, at block 620, if the number of data samples of the historical conditional data is not below the threshold number, then at block 660, the data analytical device 110 may determine the historical result data based on the historical conditional data, just as described above, and at block 650, the data analytical device 110 may generate the association based on the historical conditional data and the historical result data. It should be understood that where there are sufficient historical conditional data samples, the building process for the association may further be optimized by obtaining expert knowledge.

In addition, after generating the association between the factor affecting the historical event and the historical event result, i.e., a causal model, the causal model may further be adjusted. For example, edges with weaker impact on the historical event in the causal graph may be "pruned." For example, the data analytical device 110 may reduce some branches by calculating a weight of an impact factor of each node in the causal model. In addition, the "prune" process may also be implemented by receiving instructions from the user. For example, factors with less impact on the prediction target may be omitted according to user experience.

Reference is made to FIG. 5 again. At block 520, the data analytical device 110 determines at least one target result of interest selected for a current event. The current event may be associated with the historical event. For example, if the historical event is promotion situation of a certain mall in the first quarter, the current event, for example, may be promotion situation of the mall in the third quarter.

In one embodiment, an indication on data analysis may be received from the user, and a target result of interest selected for the current event may be determined based on the indication, and this target result may be an expected result which might be caused by the occurrence of the current event. For example, if the event is promotion situation of the mall in the third quarter, then the target result of interest may be a goods sale.

Alternatively, the indication may also include a plurality of target results of interest selected by the user, and these target results are all possible due to the occurrence of the event. For example, if the event is promotion situation of the mall in the third quarter, target results of interest are, for example, goods sales, sales profits, margin of sales volume growth and the like.

Compared with the conventional causal model that can only select one target result, the causal model according to the embodiments of the present disclosure achieves the prediction of a plurality of target results. This can increase the data analysis efficiency and provides expansion and flexibility for data analysis.

At block 530, the data analytical device 110 determines a current factor affecting the current event and at least one target object associated with the at least one target result of interest. Still taking the current event of promotion situation of the mall in the third quarter as an example, a current factor affecting the current event may, for example, involve promotion methods, such as goods price-off, buy-and-gift programs, point-for-gift coupon programs and the like. In one embodiment, the current factor affecting the current event may be obtained from the indication on data analysis from the user. In one embodiment, the current factor affecting the current event may also be automatically selected from factors that affect related historical events according to the at least one target result of interest selected by the user.

For the at least one target object associated with the at least one target result of interest, the solution of the present disclosure may divide the target object to different granularity. FIG. 7 illustrates a flowchart of a process of determining a target object according to the embodiments of the present disclosure. How to determine the target object will be explained in conjunction with FIG. 7.

In one embodiment, at block 710, the data analytical device 110 may determine a set of objects associated with data samples of the current conditional data of the current factor. Still taking the current event of promotion situation of the mall in the third quarter as an example, the set of objects may be, for example, all consumers. At block 720, the data analytical device 110 may further determine desired grouping granularity.

In one embodiment, an indication on data analysis may be received from the user, and the user desired grouping granularity may be determined based on the indication.

In some embodiments, the desired grouping granularity may be, for example, an individual object, for example, a certain VVIP customer of the mall. When the desired grouping granularity is individual granularity, the user may obtain training data or a new data file, select an individual through information such as sample individual ID and the like, and obtain the individual-related data as an initial value of the causal model.

In some embodiments, the desired grouping granularity, for example, may be a group of objects having a predetermined object property, for example, female consumers aged between 28 and 35. When the desired grouping granularity is group granularity, the user may obtain training data or a new data file. The data analytical device 110 may automatically make statistics on mean values of respective elements in the group, for example, calculate initial values of non-parent nodes in the causal model on the basis of the mean value of respective parent nodes in the causal graph (see FIG. 2).

In one embodiment, the desired grouping granularity may be, for example, a plurality of groups of objects, which have different object properties. When the desired grouping granularity is multi-group granularity, the user may obtain training data or a new data file, filter out different groups through filtering conditions, such as groups grouped by gender or groups grouped by goods categories, and establish causal models for different grouped groups, and calculate initial values in the causal models, separately.

At block 730, the data analytical device 110 may determine, from the set of objects, at least one target object associated with the at least one target result of interest based on the grouping granularity.

In this way, the causal model according to the embodiments of the present disclosure is able to achieve a finer-grained prediction to meet user demands on decision refinement.

In addition, in one embodiment, the data analytical device 110 may further determine a constraint condition of the current factor, the constraint condition may indicate a data scope which is selectable for the current factor. For example, the current factor affecting the current event is goods price-off, then the constraint condition may be, for example, a discount between 50% and 10%. In another example, if the current factor affecting the current event is a buy-and-gift program, then the constraint condition may be, for example, a refund amount varying from 8% to 10% according to the goods category consumption. Based on the constraint condition, the data analytical device 110 may determine the current conditional data associated with the current factor.

In one embodiment, an indication on data analysis may be received from the user, and the user desired constraint condition may be determined based on the indication.

Returning to FIG. 5, at block 540, the data analytical device 110 determines data of the at least one target result of interest at least based on the association, the current conditional data associated with the current factor and the at least one target object.

In one embodiment, the association may be the causal model described above. The data analytical device 110 may input the current conditional data and an identification of the at least one target object to the causality model, and the output of the model is taken as the data of the target result.

In addition, in one embodiment, the data analytical device 110 may obtain a conditional data sample for the at least one target object, the conditional data sample may be a historical training data sample or a new data sample. The data analytical device 110 determines the data of the target result of the at least one target object based on the conditional data sample and the causal model.

With the data analysis solution described in the present disclosure, a causal model for decision estimation can be built, which model may predict a target result for a plurality of targets and object groups with different granularities. In this way, the analysis flexibility and precision are improved. At the same time, user demands on different prediction granularities are satisfied.

Example Device

Figure 8:
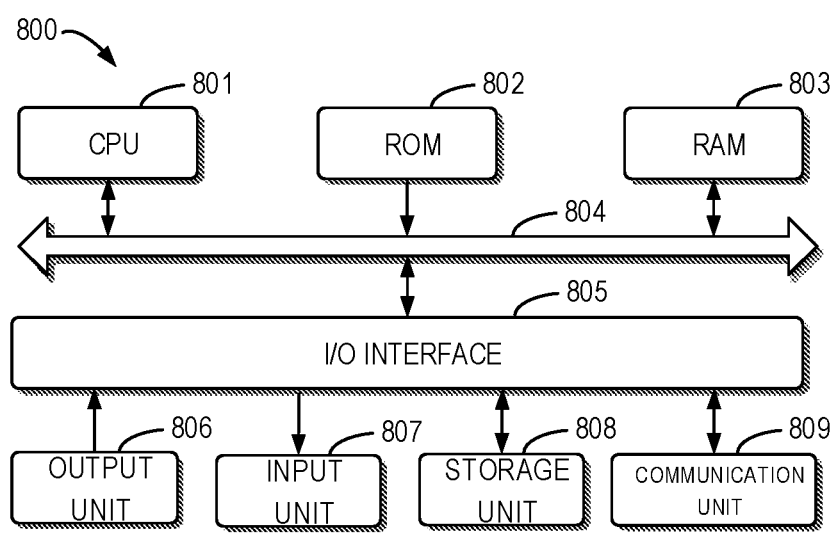
FIG. 8 shows a schematic block diagram of an example device which is applicable to implement embodiments of the present disclosure.

FIG. 8 shows a schematic block diagram of an example device 800 which is applicable to implement embodiments of the present disclosure. For example, the data analytical device 110 or the prediction unit 112 as shown in FIG. 1 may be implemented by the device 800. As depicted, the device 800 includes a central processing unit (CPU) 801, which may execute various suitable actions and processing based on the computer program instructions stored in the read-only memory (ROM) 802 or computer program instructions loaded in the random-access memory (RAM) 803 from a storage unit 808. The RAM 803 may also store all kinds of programs and data required by the operations of the device 800. CPU 801, ROM 802 and RAM 803 are connected to each other via a bus 804. The input/output (I/O) interface 805 is also connected to the bus 804.

A plurality of components in the device 800 are connected to the I/O interface 805, including: an input unit 806, such as a keyboard, mouse and the like; an output unit 807, for example, various kinds of displays and loudspeakers and the like; a storage unit 808, such as a magnetic disk and optical disk, and the like; and a communication unit 809, such as a network card, modem, wireless transceiver and the like. The communication unit 809 allows the device 800 to exchange information/data with other devices via the computer network, such as Internet, and/or various telecommunication networks.

The above described process and treatment, such as the methods 500, 600 and 700 may also be executed by the processing unit 801. For example, in some embodiments, the methods 500, 600 and 700 may be implemented as a computer software program tangibly included in the machine-readable medium, for example, the storage unit 808. In some embodiments, the computer program may be partially or fully loaded and/or mounted to the device 800 via the ROM 802 and/or the communication unit 809. When the computer program is loaded to the RAM 803 and executed by the CPU 801, one or more steps of the above described methods 500, 600 and 700 may be implemented.

The present disclosure may be a method, a device, a system and/or a computer program product. The computer program product may include a computer-readable storage medium, on which the computer-readable program instructions for executing various aspects of the present disclosure are loaded.

The computer-readable storage medium may be a tangible apparatus that maintains and stores instructions utilized by the instruction executing apparatuses. The computer-readable storage medium may be, but is not limited to, an electrical storage device, magnetic storage device, optical storage device, electromagnetic storage device, semiconductor storage device or any appropriate combinations of the above. More concrete examples of the computer-readable storage medium (non-exhaustive list) include: a portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized herein is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction may be downloaded from the computer-readable storage medium to each computing/processing device, or to an external computer or external storage via Internet, local area network, wide area network and/or wireless network. The network may include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure may be assembly instructions, instructions of instruction set architecture (ISA), machine instructions, machine-related instructions, microcodes, firmware instructions, state setting data, or source codes or target codes written in any combinations of one or more programming languages, where the programming languages include object-oriented programming languages, for example, Smalltalk, C++ and so on, and conventional procedural programming languages, such as "C" language or similar programming languages. The computer-readable program instructions may be implemented fully on the user computer, partially on the user computer, as an independent software package, partially on the user computer and partially on the remote computer, or completely on the remote computer or server. In the case where a remote computer is involved, the remote computer can be connected to the user computer via any type of network, including a local area network (LAN) and wide area network (WAN), or to the external computer (e.g., connected via Internet using an Internet service provider). In some embodiments, state information of the computer-readable program instructions is used to customize an electronic circuit, for example, programmable logic circuit, field programmable gate array (FPGA) or programmable logic array (PLA). The electronic circuit may execute computer-readable program instructions to implement various aspects of the present disclosure.

Various aspects of the present disclosure are described herein with reference to flow charts and/or block diagrams of method, apparatus (system) and computer program products according to embodiments of the present disclosure. It should be understood that each block of the flow charts and/or block diagrams and the combination of various blocks in the flow charts and/or block diagrams can be implemented by computer-readable program instructions.

The computer-readable program instructions may be provided to the processing unit of a general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions may also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions may also be loaded into a computer, other programmable data processing apparatuses or other devices, so as to execute a series of operation steps on the computer, the other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow charts and block diagrams in the drawings illustrate system architecture, functions and operations that may be implemented by a system, a method and a computer program product according to a plurality of embodiments of the present disclosure. In this regard, each block in the flow chart or block diagram may represent a module, a part of program segment or code, where the module and the part of program segment or code include one or more executable instructions for performing stipulated logic functions. In some alternative embodiments, it should be noted that the functions indicated in the block may also take place in an order different from the one indicated in the drawings. For example, two successive blocks may be in fact executed in parallel or sometimes in a reverse order depending on the functions involved. It should also be noted that each block in the block diagram and/or flow chart and combinations of the blocks in the block diagram and/or flow chart may be implemented by a hardware-based system exclusive for executing stipulated functions or actions, or by a combination of dedicated hardware and computer instructions.

Various embodiments of the present disclosure have been described above and the above description is only exemplary rather than exhaustive and is not limited to the embodiments of the present disclosure. Many modifications and alterations, without deviating from the scope and spirit of the explained various embodiments, are obvious for those skilled in the art. The selection of terms in the text aims to best explain principles and actual applications of each implementation and technical improvements made in the market by each implementation, or enable others of ordinary skill in the art to understand embodiments of the present disclosure.

We claim:

1. A method for data analysis, comprising:
generating, at least based on historical conditional data associated with a historical factor affecting a historical event and historical result data, an association between the historical factor and a result of the historical event, the historical result data indicating the result of the historical event caused by the historical factor;
determining at least one target result of interest selected for a current event, the current event being associated with the historical event;
determining a current factor affecting the current event and determining at least one target object associated with the at least one target result of interest; and
determining data of the at least one target result of interest at least based on the association, current conditional data associated with the current factor and the at least one target object,
wherein the determining the at least one target object comprises:
determining a set of objects associated with data samples of the current conditional data of the current factor;
determining a desired grouping granularity; and
determining, from the set of objects, the at least one target object associated with the at least one target result of interest based on the grouping granularity,
forming a causal model based on the data of the at least one target result of interest, wherein the causal model is generated based on a Bayesian network,
based on the causal model, predicting a first policy to be used among different policies, wherein the first policy maximizes a value of objective with respect to the at least one target object, and
adjusting, based on the first policy, processing values of a directed acyclic graph, thereby improving an obtained value of the objective,
wherein the grouping granularity comprises at least one of:
an individual object,
a group of objects having a predetermined object property, and
a plurality of groups of objects, the plurality of groups of objects having different object properties.

2. The method of claim 1, further comprising:
obtaining historical conditional data, the historical conditional data comprising at least one of the following:
historical conditional data of continuous type, and
historical conditional data of discrete type.

3. The method of claim 2, wherein obtaining the historical conditional data comprises:
obtaining the historical conditional data periodically from a data collection device.

4. The method of claim 2, wherein generating the association comprises:
in accordance with a determination that a number of data samples of the obtained historical conditional data is below a threshold number, obtaining reference data, the reference data indicating impact degree of the historical conditional data on the historical result data;
determining the historical result data based on the historical conditional data and the reference data; and
generating the association based on the historical conditional data and the historical result data.

5. The method of claim 1, wherein determining the at least one target result of interest comprises:
receiving a first indication on the data analysis from a user device; and
determining the at least one target result of interest based on the first indication.

6. The method of claim 1, further comprising:
determining a constraint condition for the current factor, the constraint condition indicating a data scope which is selectable for the current factor; and
determining, based on the constraint condition, the current conditional data associated with the current factor.

7. The method of claim 6, wherein determining the constraint condition comprises:
obtaining a second indication on the data analysis from a user device; and
determining the constraint condition based on the second indication.

8. The method of claim 1, wherein determining the grouping granularity comprises:
obtaining a third indication on the data analysis from a user device; and
determining the constraint condition based on the third indication.

9. The method of claim 1, wherein the association is a causality model, and wherein determining the data of the at least one target result of interest comprises:
determining the data of the target result by inputting the current conditional data and an identification of the at least one target object to the causality model.

10. The method of claim 1, further comprising:
outputting the determined data of the at least one target result of interest to a user device.

11. The method of claim 1, further comprising:
displaying the determined data of the at least one target result of interest for a user device.

12. The method of claim 1, further comprising:
obtaining a predetermined reference value of the at least one target result of interest; and
in accordance with a determination that a difference between the data and the predetermined reference value exceeds a threshold difference, outputting a signal characterizing the difference to a user device.

13. A device for backing up data, comprising:
at least one processing unit;
a memory, coupled to the at least one processing unit and storing instructions which, when executed by the at least one processing unit, cause the device to perform acts comprising:
generating, at least based on historical conditional data associated with a historical factor affecting a historical event and historical result data, an association between the historical factor and a result of the historical event, the historical result data indicating the result of the historical event caused by the historical factor;
determining at least one target result of interest selected for a current event, the current event being associated with the historical event;
determining a current factor affecting the current event and determining at least one target object associated with the at least one target result of interest;
determining data of the at least one target result of interest at least based on the association, current conditional data associated with the current factor and the at least one target object,
wherein the determining the at least one target object comprises:
determining a set of objects associated with data samples of the current conditional data of the current factor;
determining a desired grouping granularity; and
determining, from the set of objects, the at least one target object associated with the at least one target result of interest based on the grouping granularity,
forming a causal model based on the data of the at least one target result of interest, wherein the causal model is generated based on a Bayesian network,
based on the causal model, predicting a first policy to be used among different policies, wherein the first policy maximizes a value of objective with respect to the at least one target object, and
adjusting, based on the first policy, processing values of a directed acyclic graph, thereby improving an obtained value of the objective,
wherein the grouping granularity comprises at least one of:
an individual object,
a group of objects having a predetermined object property, and
a plurality of groups of objects, the plurality of groups of objects having different object properties.

14. The device of claim 13, wherein generating the association comprises:
in accordance with a determination that a number of data samples of the obtained historical conditional data is below a threshold number, obtaining reference data, the reference data indicating impact degree of the historical conditional data on the historical result data;
determining the historical result data based on the historical conditional data and the reference data; and
generating the association based on the historical conditional data and the historical result data.

15. The device of claim 13, wherein determining the at least one target result of interest comprises:
receiving a first indication on the data analysis from a user device; and
determining the at least one target result of interest based on the first indication.

16. The device of claim 13, the acts further comprising:
determining a constraint condition for the current factor, the constraint condition indicating a data scope which is selectable for the current factor; and
determining, based on the constraint condition, the current conditional data associated with the current factor.

17. A computer-readable storage medium, having a computer program stored thereon, the computer program, when executed by a processor, performing acts comprising:
generating, at least based on historical conditional data associated with a historical factor affecting a historical event and historical result data, an association between the historical factor and a result of the historical event, the historical result data indicating the result of the historical event caused by the historical factor;

determining at least one target result of interest selected for a current event, the current event being associated with the historical event;

determining a current factor affecting the current event and determining at least one target object associated with the at least one target result of interest;

determining data of the at least one target result of interest at least based on the association, current conditional data associated with the current factor and the at least one target object, wherein the determining the at least one target object comprises:

determining a set of objects associated with data samples of the current conditional data of the current factor;

determining a desired grouping granularity; and determining, from the set of objects, the at least one target object associated with the at least one target result of interest based on the grouping granularity, forming a causal model based on the data of the at least one target result of interest, wherein the causal model is generated based on a Bayesian network, based on the causal model, predicting a first policy to be used among different policies, wherein the first policy maximizes a value of objective with respect to the at least one target object, and adjusting, based on the first policy, processing values of a directed acyclic graph, thereby improving an obtained value of the objective, wherein the grouping granularity comprises at least one of:

an individual object, a group of objects having a predetermined object property, and a plurality of groups of objects, the plurality of groups of objects having different object properties.

* * * * *